United States Patent [19]

Joshi

[11] Patent Number: 5,399,246

[45] Date of Patent: Mar. 21, 1995

[54] INERT GAS PURIFICATION

[75] Inventor: Ashok V. Joshi, Salt Lake City, Utah

[73] Assignee: Ceramatec, Inc., Salt Lake City, Utah

[21] Appl. No.: 112,767

[22] Filed: Aug. 26, 1993

[51] Int. Cl.$^6$ .................. B01D 53/00; B01D 71/00
[52] U.S. Cl. ............................. 204/130; 423/235
[58] Field of Search ................. 204/130, 68; 55/12, 55/16, 66, 68

[56] References Cited

U.S. PATENT DOCUMENTS

| | | | |
|---|---|---|---|
| 3,943,751 | 3/1976 | Akiyama et al. | 73/27 R |
| 4,477,265 | 10/1984 | Kumar et al. | 55/26 |
| 4,859,296 | 8/1989 | Marianowski et al. | 204/129 |
| 5,035,726 | 7/1991 | Chen et al. | 55/16 |

Primary Examiner—John Niebling
Assistant Examiner—Arun S. Phasge
Attorney, Agent, or Firm—Trask, Britt & Rossa

[57] ABSTRACT

A method for purifying crude argon is disclosed. Trace amounts of oxygen and/or nitrogen are removable by using a combination of a nitride forming metal and an oxygen ion conducting electrolyte cell. Lithium may be electrolytically recovered from lithium nitride. Alternatively, a reactive metal such as lithium may be utilized to remove trace amounts of both nitrogen and oxygen from crude argon.

19 Claims, 5 Drawing Sheets

INERT GAS PURIFICATION

BACKGROUND OF THE INVENTION

1. Field of the Invention

This invention relates to a method and apparatus for removing trace amounts of oxygen and nitrogen from crude argon and to particular apparatus useful in said removal wherein the crude argon is generally obtained by cryogenic distillation of air.

2. State of the Art

Argon is a useful inert gas which has many application such as in light bulbs, in the welding of metals, as inert atmosphere for steel production as well as in various electronic industries, and the like. A major source of argon is atmospheric air, about 1% of which is argon.

Commercially, argon is produced as a valuable by-product in cryogenic air separation plants for producing oxygen and nitrogen. Crude argon produced cryogenically usually contains trace amounts of nitrogen (100 ppm to 1% by volume) and appreciable quantities of oxygen (100 ppm to 7% by volume). This crude argon stream must be purified to reduce nitrogen and oxygen before it is suitable for use, particularly as an inert gas. Because of the proximity of the boiling point of argon (87.28° K.) and oxygen (90.19° K.), distillative separation of argon and oxygen in particular is very difficult and energy intensive.

Heretofore, oxygen has been removed from crude argon streams by catalytic reduction to water with excess hydrogen over platinum catalyst beds, referred to herein as the deoxo process, followed by drying to remove the water and then by dual pressure distillation to remove nitrogen and excess hydrogen. See, for example, R. E. Latimer, "Distillation of Air," *Chemical Engineering Process,* pp. 35–59, February 1967, which illustrates a typical scheme.

Although argon streams purified by this method usually contain only ppm levels of nitrogen, oxygen and hydrogen, the process does have significant drawbacks. First, the hydrogen used in conventional cryo/deoxo processes is expensive. For example, for a crude argon stream containing only about 2.8% oxygen, about 3 mols of hydrogen are consumed for each ton of argon processed. At eight dollars per thousand standard cubic feet of hydrogen cost, the oxygen removal cost is $9.20 per ton of argon for hydrogen consumption alone. Further, hydrogen is not always conveniently available in many parts of the world.

Another shortcoming of the cryo/deoxo process for purifying argon is that the water produced from the deoxo reaction must be removed completely before the argon is fed to the final cryogenic distillation column. This requires feeding the argon stream through a dryer preliminary to the cryogenic distillation. Capital and operating costs associated with this additional step add significantly to overall cost.

Further, the excess hydrogen introduced to remove the oxygen in the first place must itself be removed and recovered before a pure argon stream can be produced. This adds further to the complexity and cost of the overall design and operation of the process.

A more recent concept for purifying crude argon is disclosed in U.S. Pat. No. 5,035,726, assigned to Air Products. The patent discloses deoxygenating crude argon by use of an oxygen ion transporting membrane, i.e. a solid electrolyte oxygen concentration (SEOC) unit, and then removing nitrogen by returning the oxygen-depleted argon stream to an argon/nitrogen cryogenic distillation unit. Such an argon purification system must necessarily be located close to an argon/nitrogen/oxygen production facility, which is usually a large plant.

Also, the Air Products system involves heating cooled crude argon to the operating temperature of the SEOC unit, which is typically about 700° C. and above, then cooling the oxygen-depleted argon and refrigerating it to a cryogenic distillation temperature ($\sim 87.28°$ K. or $\sim -185°$ C.). Heating and Cooling of the argon gas to such temperature extremes tends to be energy inefficient. Further, the Air Products system contemplates $Bi_2O_3$ as an electrolyte, which is generally unstable under conditions of low $O_2$ concentration, tending then to reduce to electronically conducting bismuth suboxides or even bismuth metal.

Other techniques for purifying argon gas streams have also been suggested. For example, U.S. Pat. Nos. 4,144,038 and 4,477,265 suggest separating argon from oxygen using aluminosilicate zeolites and molecular sieves. Such processes trade argon recovery for purity.

U.S. Pat. No. 4,230,463 suggests using polymeric membranes such as polysulfones, polysiloxanes, polyaryleneoxides, polystyrenes, polycarbonate, cellulose acetate and the like for separating pairs of gases such as hydrogen and argon and polymeric membranes such as polysulfones have been suggested for the removal of oxygen from argon. Studies of hybrid processes involving cryogenic distillation and membrane separation have been reported as, see, for example, Jennings, et al., "Conceptual Processes for Recovery of Argon with Membranes in an Air Separation Process," *American Institute of Chemical Engineers,* 1987 Summer National Meeting, and Agrawal, et al., "Membrane/Cryogenic Hybrid Scheme for Argon Production from Air," *American Institute of Chemical Engineers,* 1988 Summer Meeting in Denver, Colo. Selectivity and recovery in such hybrid schemes has been rather poor. Much of the argon permeates with oxygen through membranes and must be recycled to crude argon distillation columns.

Another technique for removing trace amounts of oxygen and other impurities from argon has involved lithium containing organic resins. Generally, the lithium is not regenerated. The lithium converts to lithium oxide.

Therefore, there is a need in the industry for an improved process for purifying crude argon produced by cryogenic air separation.

SUMMARY OF THE INVENTION

A process and system have been invented for removing trace amounts of oxygen and nitrogen as well as water from crude argon. In a first stage oxygen-removal unit the crude argon is contacted with an oxide forming metal or with an oxygen-ion conducted electrolyte which is capable of transporting oxygen across the electrolyte to remove the oxygen from the argon gas. The crude argon generally emanates from a cryogenic distillation unit which produces oxygen, nitrogen and argon. Crude argon from a cryogenic unit typically contains up to 5% oxygen and up to 1% of nitrogen. Thus, the term "crude," for the purposes of this invention applies to argon having minor amounts of oxygen and/or nitrogen in it, regardless of its source.

The oxygen removing stage, preferably as a first stage, comprises a solid state oxygen-ion conducting electrolyte stable under conditions of low oxygen concentration such as zirconia, ceria, hafnia, thoria, $La_{1-x} Sr_x Y_{1-z} Ca_z O_3$—$x/2$—$z/2$ or like compounds operated under either a high pressure differential with a mixed ion conductor, which is an electrolyte which conducts both oxygen ions and electrons, to cause oxygen ions to flow through the electrolyte leaving the oxygen depleted argon on one side of the electrolyte or, as preferred, under the influence of a significant imposed voltage to cause the oxygen ion migration to occur. Under conditions of very low oxygen partial pressure and high current densities, zirconia is especially preferred as a said electrolyte. Such a system is detailed in co-pending applications Ser. No. 08/056,168, now abandoned and Ser. No. 07/842,920, now abandoned commonly assigned, the description of electrolyte cells therein being incorporated by reference.

In a second stage nitrogen removal unit, the oxygen depleted argon is contacted with a nitride forming metal such as lithium to react trace amounts of nitrogen with the metal, e.g. lithium, to form a metal nitride. The metal nitride is then electrolytically reconverted to the base metal, preferably in situ, by electrolytic means. $Li_3N$ is the lithium conducting solid electrolyte material. The electrodes of $TiN_3$ takes place as shown in FIG. 7. At the anode, $Li_3N$ decomposes to lithium ions and $N_2$ gas and electrons. The lithium ions transport to cathode and combine with electrons to form lithium metal at the cathode place. This reaction will proceed until most of the $Li_3N$ is converted to lithium metal. The nitrogen forming metal may be in molten form; metals having a low melting point are, therefore, preferred.

In an alternative embodiment, oxygen, nitrogen and moisture, if any is present, may be removed in a single stage unit, as may be fully disclosed hereinafter. Such single stage unit generally contains a molten reactive metal, such as alkali metal or alkaline earth, which may be regenerated, preferably in situ.

This process and system is especially useful inasmuch as it may be used at the point of manufacture of argon gas, usually by cryogenic distillation means, or by use at the point of use of argon as an inert gas. The Semiconductor Industry, for example, requires argon gas of extreme purity. The present invention process takes out even traces (ppb level) of other impurities such as Cl $CO_2$ since lithium getter is extremely active. The invention is further advantageous in as much as the units may be large scale units or may be very compact units, for example, efficient units can be small enough to fit in a suitcase.

The techniques of the instant invention may be used to remove oxygen and/or nitrogen from other inert gases such as neon, helium, xenon and the like.

DETAILED DESCRIPTION OF THE INVENTION

Figure 1:
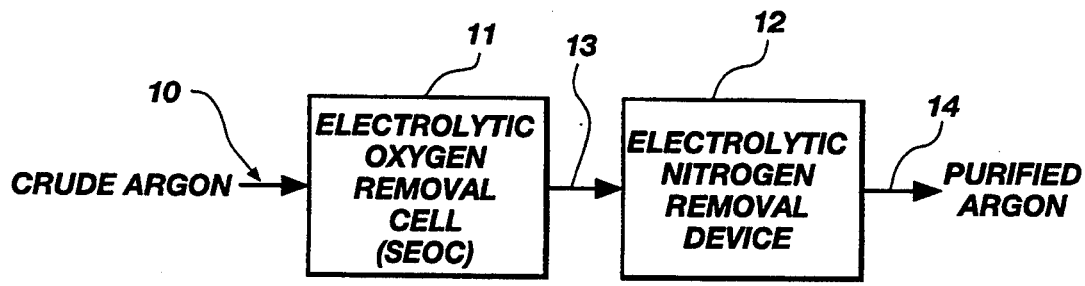
FIG. 1 is a schematic illustration of the process of the instant invention.

The process and systems of this invention for removing trace amounts of oxygen and nitrogen from crude argon generally includes a first stage which is preferably an oxygen removal stage. Oxygen is removed from the crude argon stream by causing dissociation of the oxygen ions and passage of the oxygen ions through a solid membrane, especially an electrolyte such as zirconia, ceria, hafnia, thoria and compounds such as $La_{1-x} Sr_x Y_{1-z} Ca_z O_3$—$x/2$—$z/2$ and the like, preferably by means of imposing an electrical current across the electrolyte to induce such migration. Alternatively, the electrolyte may be a mixed conductor electrolyte wherein both electrons and oxygen ions are transported across the electrolyte and the driving force is provided by a significant oxygen pressure differential across the electrolyte. Zirconia is especially preferred, although thoria, hafnia and $La_{1-x} Sr_x Y_{1-z} Ca_z O_3$—$x/2$—$z/2$ are also especially useful oxygen conducting electrolytes under conditions of large voltage potentials and low oxygen concentration.

In a typical first stage oxygen removal unit the crude argon is fed into the stage after preferably being preheated to a temperature of at least 300° C. and, preferably, in the range of about 500° C. and above. The operating temperature of the first stage oxygen removal unit is generally in the range of about 500° C. to about 900° C. and preferably in the range of about 700° to 800° C. In a preferred process, the argon is introduced into the oxygen removal unit at a temperature close to the preferred operating temperature of the unit.

The oxygen removal unit may be of the type described in detail in co-pending patent application Ser. No. 08/056,168, the specification of said application being incorporated herein by reference.

The nitrogen removal unit is generally downstream from the oxygen removal unit so that an oxygen depleted stream of argon containing trace amounts of nitrogen is fed to the nitrogen removal unit. The nitrogen removal unit preferably also acts as a heat exchanger wherein the cool crude argon is passed through the nitrogen removal unit which acts as a preheater to preheat the crude argon before it has been fed to the oxygen removal unit. The nitrogen removal unit may be constructed in the form of a finned heat exchanger. The operating temperature of the nitrogen removal unit is generally above ambient temperature and preferably below 200° C. The nitrogen removal unit utilizes a nitride-forming metal in a form either having a large surface area so that the nitrogen within the crude argon may react with the metal and thereby remove the nitrogen from the argon or in the molten state. The crude argon being pre-heated before being directed to the oxygen removal unit is isolated from the nitride forming metal. Generally, it is desirable to operate the nitrogen removal units in a batch wise operation.

The second stage, that is, the nitrogen removal stage, is one in which oxygen depleted argon is contacted with a nitride-forming metal to convert the metal into a metal nitride, thereby removing the trace amounts of nitrogen from the argon gas. The reaction, when the nitride-forming metal is lithium, occurs as follows:

$$6Li + N_2 \rightarrow 2Li_3N$$

Figure 7:
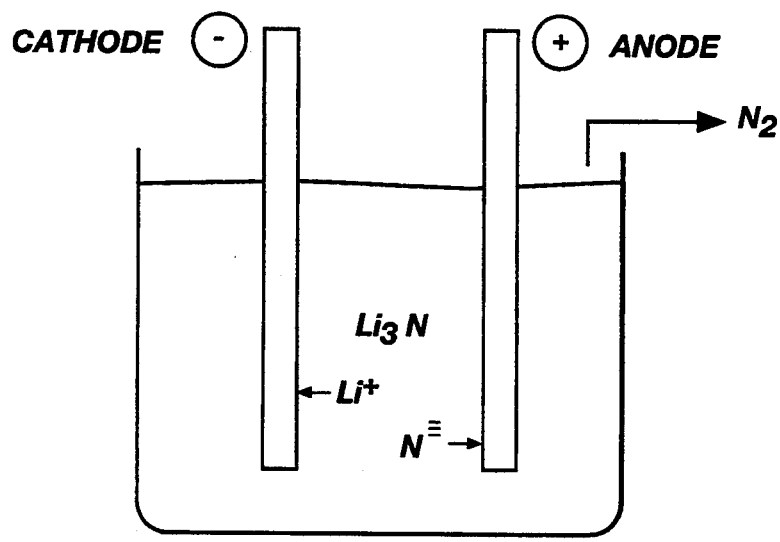
FIG. 7 illustrates an electrochemical cell for decomposing $Li_3N$ into lithium and nitrogen.

The lithium metal is converted to lithium nitride in the nitrogen removal unit. The nitrated lithium is placed in an electrolytic cell to recover essentially pure lithium and nitrogen whereby the reactions at the anode and cathode are as follows (as shown in FIG. 7):

$$\text{(Anode)} \quad 2N^{---} \rightarrow N_2 \uparrow + 6e$$

$$\text{(Cathode)} \quad 6Li^+ + 6e \rightarrow 6Li$$

It is especially convenient to have the nitrogen removal unit constructed as an electrolytic cell so that the lithium nitride may be regenerated, in situ, to lithium metal. $Li_3N$ is a solid electrolyte with lithium ion conduction. It is desirable, therefore, to associate two nitrogen removal units with one oxygen removal unit whereby the nitrogen removal units are used alternatingly, i.e. in batchwise fashion.

Figure 2:
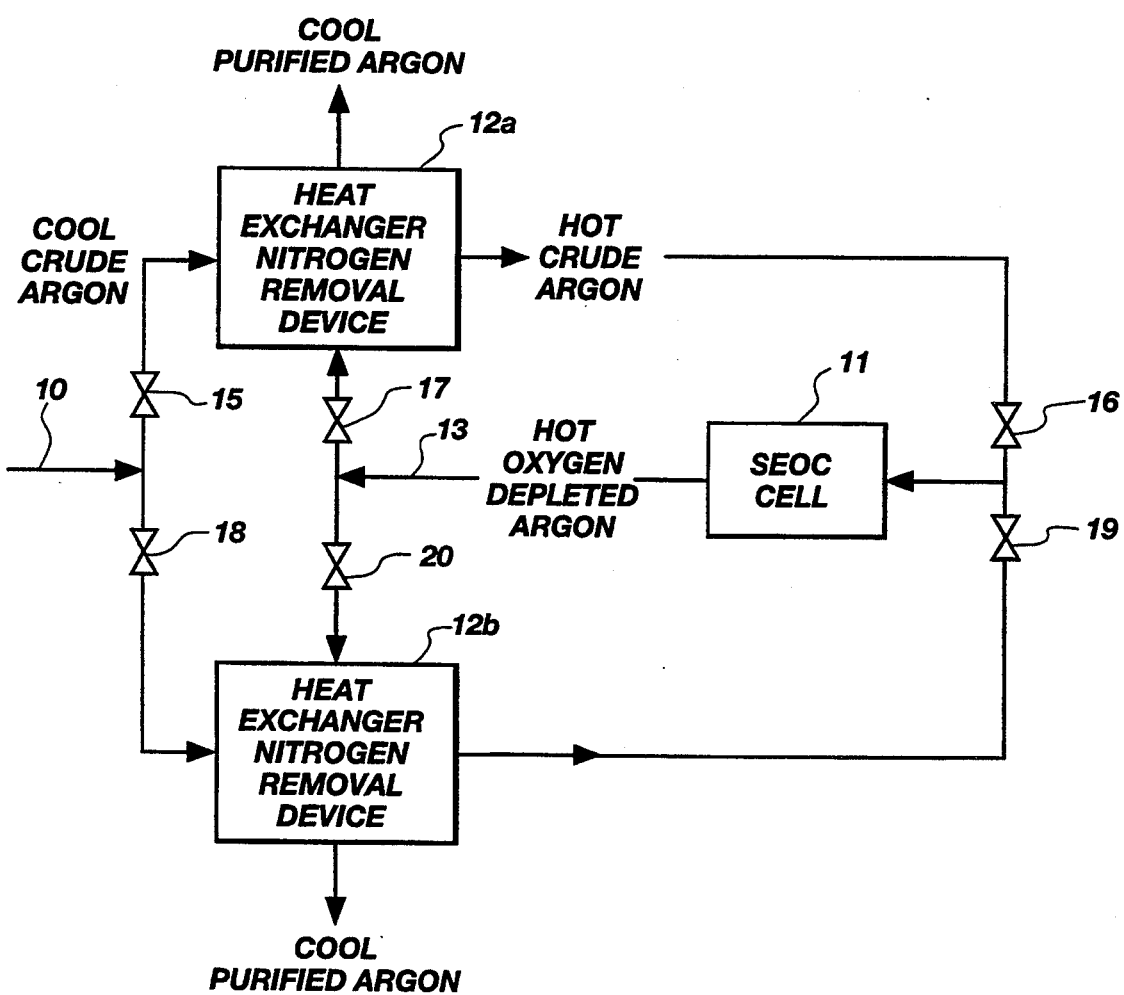
FIG. 2 is a schematic illustration of the instant invention system having two nitrogen removal devices in parallel which are operated sequentially.

The process and system of the instant invention are illustrated in FIGS. 1 and 2.

FIG. 1 is a schematic fundamental representation of the invention wherein a crude argon stream 10 from a source of crude argon, e.g., bulk argon in cylinders or storage units or directly from a crude argon manufacturing facility, such as a cryogenic air distillation facility, is directed to an oxygen removal cell 11 of the type described herein. The oxygen-depleted crude argon, which contains trace $N_2$, is directed to a nitrogen removal device 12 of the type described herein.

The oxygen removal cell 11 is preferably one which employs an oxygen ion transport membrane, especially a metal oxide based solid electrolyte. These are generally operated at an elevated temperature, generally above 500° C. and preferably at about 700°–800° C. Thus, it is generally advantageous to preheat the crude argon entering the oxygen removal cell 11.

The oxygen-depleted, nitrogen contaminated argon stream 13 is very hot when it leaves cell 11 and enters device 12. The device 12 typically contains a nitrogen reactive material, esp. a metal such as lithium, which is reactive at temperatures above about 25° C. Preferred operating temperatures are from about 100° C. to about 200° C. Because of the heat content of argon stream 13, it is unnecessary to add any heat in device 12.

Purified argon stream 14 exits device 12. The purified argon stream is essentially devoid of the presence of either oxygen or nitrogen. If any oxygen or nitrogen is present, it is present in quantities less than 0.0001%, or less than about 1 part per million (ppm).

The purification process illustrated in FIG. 2 is a thermally efficient one which exchanges the heat content of the oxygen-depleted argon stream 13 with the cool crude argon stream 10. The process uses a pair of nitrogen removal devices 12a and 12b which are dual units operated alternatingly, i.e., one unit is "on-stream" while the other unit is being recharged or regenerated. As indicated elsewhere herein, the nitrogen removal stage is a batch wise operation.

The units 12a and 12b are structured as heat exchangers so that the cool crude argon is not in direct contact with purified argon. The units may employ finned tubes wherein the cool argon stream 13 passes in contact with the external surface of banks of finned tubes while the nitrogen reactive metal is contained within the tubes and through which the hot oxygen-depleted argon flows.

The system of FIG. 2 can be operated with valves 15, 16 and 17 in an open condition and valves 18, 19 and 20 in a closed condition. Any make-up heat necessary in the system due to radiation losses and the like can be supplied by a heating element within the oxygen removal cell 11.

Generally, it is very desirable to maintain a relatively uniform temperature within the oxygen removal cell 11, esp. when the cell employs a metal oxide, e.g., $ZrO_2$, electrolyte. Thermal shock or thermal cycling is generally to be avoided or at least minimized inasmuch as possible. These devices often contain glass seals and ceramic components wherein an exact match of coefficients of thermal expansion is not possible, so that temperature cycling can result in undesirable thermal stresses.

The system of FIG. 2 is advantageous inasmuch as the oxygen removal unit 11 can be operated continuously at a relatively uniform temperature, while devices 12a and 12b can be operated batch wise.

The nitrogen removal unit preferably contains lithium metal, which is very reactive at temperatures of ambient to about 500° C. with nitrogen. A significant advantage of such removal system is that it can be regenerated in situ to reconvert lithium nitride to lithium metal. $Li_3N$ is a lithium conductive solid electrolyte material. The decomposition potential for $Li_3N$ is about 0.46 volts at 25° C. and about 0.35 volts at 300° C.

The nitrogen removal device of FIG. 1 includes a container in which Li metal in granular form is contained. The Li metal preferably is finely divided and has a large surface area per unit volume or per unit weight. Hot oxygen-depleted argon containing trace nitrogen is introduced to the nitrogen removal zone 12 via stream 13. Purified argon stream 14 exits the nitrogen removal zone. When the Li approaches saturation with nitrogen, the nitrogen removal unit is taken out of operation and the lithium nitride is regenerated electrolytically in situ.

Figure 3:
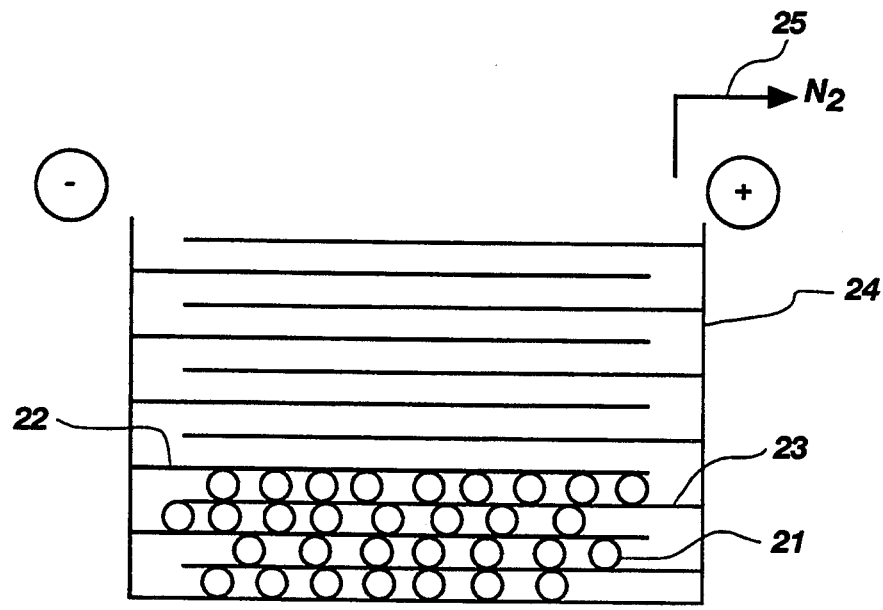
FIG. 3 illustrates a metal nitride electrolytic regeneration unit.

Internally, the container, especially for regeneration purposes, may have a structure such as that illustrated in FIG. 3 wherein the lithium particles 21, in nitride form predominantly, are compressed between anode plates 22 and cathode plates 23. At elevated temperatures and under the influence of direct current, the anode and cathode reactions set forth hereinabove occur. Nitrogen exits container 24 at outlet 25. It is essential that the electrodes maintain intimate contact with the lithium nitride particles and that the particles themselves are tightly packed together to provide a good electrical path through the mass of particles. The electrodes could be oriented vertically so that the effect of gravity would tend to provide compaction of the particles, resulting in good contact with at least a significant area of the electrode.

Figure 4:
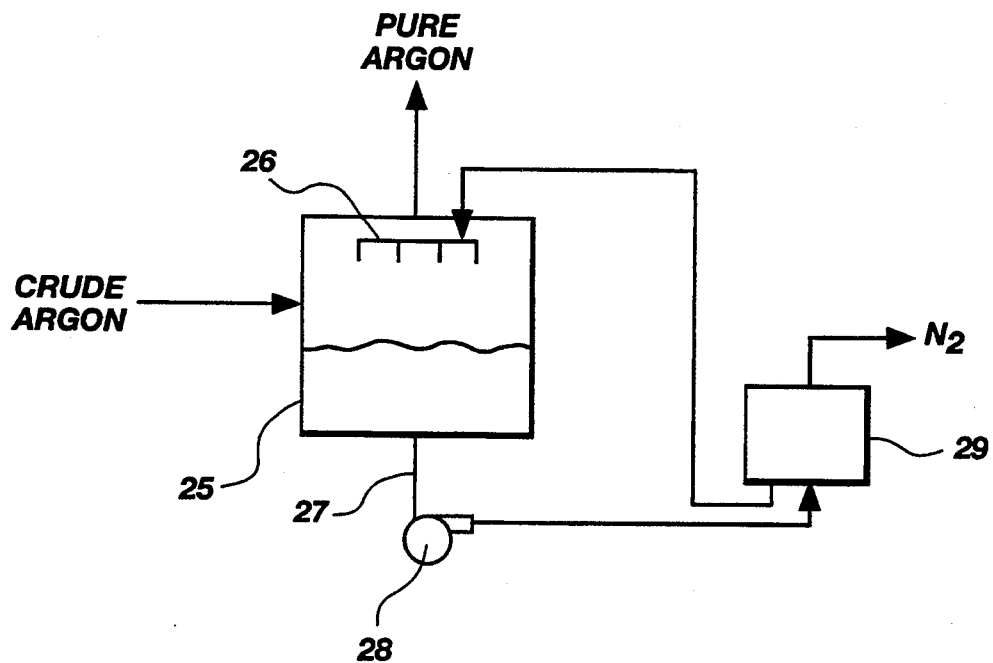
FIG. 4 illustrates a nitrogen removal system in which the nitrogen removing metal is continually circulated to a regeneration unit.

Another system for regeneration of lithium nitride is illustrated in FIG. 4 wherein lithium metal, which melts at about 186° C. is maintained in a molten state in the nitrogen removal unit. Hot, ~300° C. to 700° C., oxygen-depleted crude argon is introduced into a chamber 25 in which molten lithium metal cascades, or is sprayed, from a nozzle 26, down through the chamber while the argon preferably passes countercurrently up through the chamber. Non-reactive (inert) ceramic structures, e.g. Raschig rings, may be used to provide extensive surface area contact between the cascading molten lithium and the argon gas.

A molten lithium stream 27 containing $Li_3N$, which may be present as entrained solids is discharged from the bottom of chamber 25 and pumped via pump 28 to an electrolytic cell 29 wherein electrodes immersed in the molten lithium very effectively cause the desired anode and cathode reactions to occur. Nitrogen gas exits the electrolytic cell and molten lithium, essentially devoid of $Li_3N$, is returned to the nitrogen removal unit. A small heating element may be required in the electrolytic cell to maintain the lithium metal in a molten state.

Use of lithium in a molten state permits continuous regeneration of the lithium and is very efficient in removing nitrogen because of the elevated temperature involved and the large surface area of exposed lithium.

Figure 5:
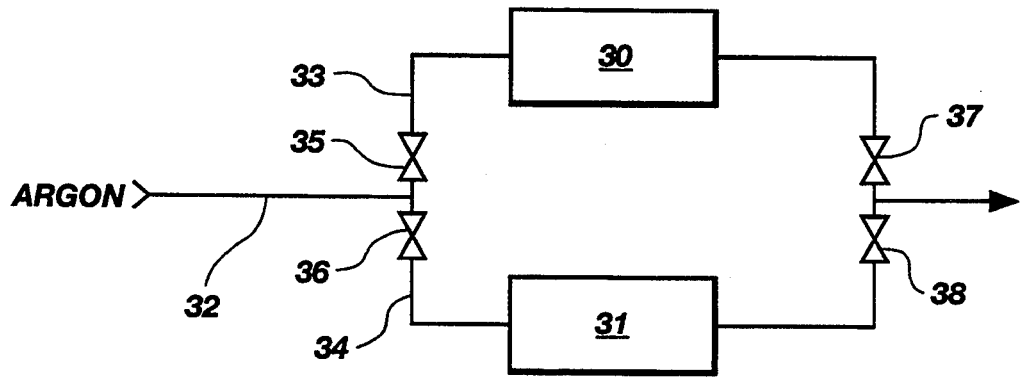
FIG. 5 is a dual path argon purifier having a pair of lithium charged electrolytic cells wherein the cells may be operated and regenerated sequentially.

A single stage oxygen, nitrogen and water removal unit, in parallel with a similar unit is illustrated in FIG. 5. Each removal unit 30 and 31 is an electrolytic cell containing lithium, preferably in a molten state. An argon feed line 32 is joined to a "Tee" connection from which conduits 33 and 34 direct the impure argon to electrolytic cells 30 and 31. Valves 35 and 36 are in the conduits 33 and 34 while valves 37 and 38 are in the discharge lines from said cells. When valves in one line are open, the impure argon is fed to a cell wherein any oxygen, nitrogen or water present is removed. After a certain period of time, the lithium metal is converted to the mixture lithium oxide and lithium nitride. At such time, the impure argon stream is directed to the other cell which contains regenerated lithium.

Regeneration of lithium oxide and/or lithium nitride may be accomplished electrolytically. Both $Li_2O$ and $Li_3N$ are solid electrolytes which conduct lithium metal. $Li_2O$ decomposition voltage is about three volts at 25° C. while $Li_3N$ decomposition potential is 0.46 volts at 25° C. At temperatures above 180° C. under potential of four volts (greater than decomposition potential of $Li_2O$, $Li_3N$ and $Li_2O$ will decompose to term lithium metal at the cathode (-ve electrode) and $N_2$ and oxygen gas at the anode (the electrode). This is done at elevated temperatures preferably above 180° C. Molten lithium metal is then formed simply by electrolysis of lithium oxide and/or lithium nitride and trace amounts of lithium chloride. Generally, some unconverted lithium metal is generally present in the material to be regenerated and provides a readily meltable material to assist in the establishment of an electrolyte so that electrolysis can proceed. The resultant oxygen and nitrogen products from electrolytic cells 30 are flushed out and pure lithium metal is ready for further use in the purification of argon.

Figure 6:
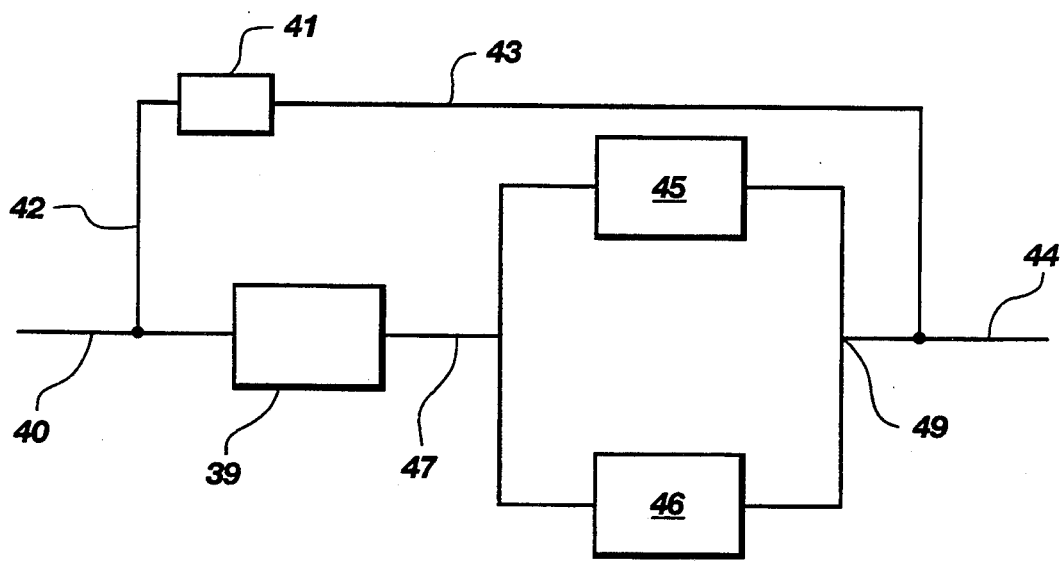
FIG. 6 illustrates the point of use extremely pure argon device with electronic control and measurement system for preferably semiconductor application.

FIG. 6 illustrates an argon purification system employing very accurate oxygen analyzer/control device which measures inlet oxygen contaminant and exiting oxygen levels. An analyzer such as that available from Ceramatec, OAIS Oxygen Analyzer and Control, is capable of detecting oxygen concentrations as low as one ppb (parts per billion).

The system of FIG. 6 has an electrolytic oxygen removal unit 39 to which crude argon stream 40 is fed. The oxygen analyzer/controller 41 has a line 42 to sample the crude argon stream 40 as well as a sample stream 43 connected to purified argon stream 44.

Nitrogen removal units 45 and 46 are connected in parallel so that the oxygen depleted argon stream 47 may be directed either to nitrogen removal unit 45 or 46. The stream 47 or 48 exiting the nitrogen removal units 45 or 46 is monitored beyond their junction 49 by oxygen analyzer/controller 41. The analyzer/controller device 41 monitors inlet and outlet oxygen concentrations. The device 41 may control the electrolytic cell 39 in response to oxygen levels in stream 40, i.e. a higher voltage may be imposed on cell 39 if the oxygen content in stream 40 increases or if the oxygen content in exit stream 44 increases. Also, the system may be used without a cell 39, wherein oxygen, nitrogen and water are removed by units 45 and 46, which are charged with lithium, for example. In such a situation, the device 41 would monitor only the exit stream and would switch the impure argon stream from a depleted removal unit to a regenerated unit upon detection of increasing levels of oxygen in the outlet.

The instant invention has many facets. For example, hydrogen may also be removed by alkali metals, especially lithium, when the alkali metal containing purifier unit is operated at relatively high temperatures. Lithium hydride forms relatively rapidly in molten lithium. Thus minor quantities of hydrogen as well as nitrogen may be removed from an impure argon stream or a circulating, e.g. recycled stream of argon may be continuously and purified where $H_2$ and/or $N_2$ are picked up from operation being blanketed with an inert argon gas stream.

Also, other reactive contaminants such as $Cl_2$ may be removed from an inert gas stream with a reactive alkali metal purifier.

Lithium, for example, may be recovered from LiH or $Li_3N$ by converting these to lithium oxide and recovery of pure lithium electrolytically or by electrochemical pumping of the oxygen ion through a metal oxide, i.e., zirconia, electrolyte or by pumping the lithium through a solid lithium ion conducting electrolyte such as lithium beta-alumina or Lisicon type materials (lithium super ion conducting materials).

Alkali metal purifiers may also be used to purify nitrogen contaminated with oxygen. At lower temperatures (<100° C.), sodium, preferentially react with oxygen to form $Li_2O$ and $Na_2O$; in oxygen-$N_2$ mixture, very little, if any, nitride is formed. Alkali metal may be recovered from its oxide electrolytically (a cathode and an anode in a molten bath of $Na/Na_2O$, for example,), electrochemical pumping of oxygen or alkali metal, as described above.

Since many available commercial grades of inert gas, such as nitrogen and argon, contain very minor quantities of oxygen, the further removal of oxygen to form an inert gas essentially oxygen-free may readily be accomplished by an alkali metal purifier. Such a purifier is especially useful at an end-use facility wherein the alkali metal may be contained in a replaceable canister having sufficient alkali metal to provide purification over an extended period of time, e.g. weeks or months. Such a canister, when its purification ability is diminished, could merely be replaced and the alkali metal recovered at an off-site regeneration facility or any remaining alkali metal converted to oxide and the alkali metal oxide sold as such. Although the reaction of oxygen with an alkali metal is exothermic, the minor quantity of oxygen in commercially available inert gases militates against a heat problem with replaceable canisters. Also, if necessary the canisters can be cooled or made with a large surface area to permit heat dissipation.

The systems described hereinabove also remove trace amounts of water present in inert gases. An electrochemical oxygen ion pumping cell operated at elevated temperatures causes water to decompose to form hydrogen and oxygen with the oxygen being transported through the solid metal oxide electrolyte. Both hydrogen and water react with alkali metals to form oxides and hydrides, especially at elevated temperatures.

The systems described herein are especially useful for removing oxygen, nitrogen and other trace contaminants from inert gases such as argon, helium, neon and the like.

Solid electrolytes may be utilized in various ways to remove oxygen from a gas stream, e.g., to purify an inert gas or to produce pure oxygen. Oxygen-ion conducting electrolytes such as zirconia, useful for this purpose have been described hereinabove. Zirconia is generally preferred for inert gas purification because of its thermodynamic stability. Bismuth oxide and ceria are more conductive than zirconia, however, these electrolytes are less thermodynamically stable and do not last long when subjected to the high voltage potentials used to separate minor quantities of oxygen from an inert gas.

Another technique for utilizing ion conducting electrolytes for oxygen removal has been developed. Sodium and other metal ion conducting electrolytes, especially alkali metal ion conductors, such as beta-alumina and Nasicon and Nasicon-like materials have a very high conductivity when compared with zirconia and even when compared with bismuth oxide or ceria at temperatures of 25° C. to 500° C. Sodium ion conducting beta-alumina has a conductivity at 300° C. which is equivalent to zirconia at 1000° C. Zirconia is about 100 times more conductive at 1000° C. than it is at 700° C., which is the usual temperature of operation of zirconia as an oxygen-removing electrolyte. Sodium beta-alumina, however, may be effectively operated at much lower temperatures, e.g. 300° C. to about 400° C. for extended periods of time.

Figure 9:
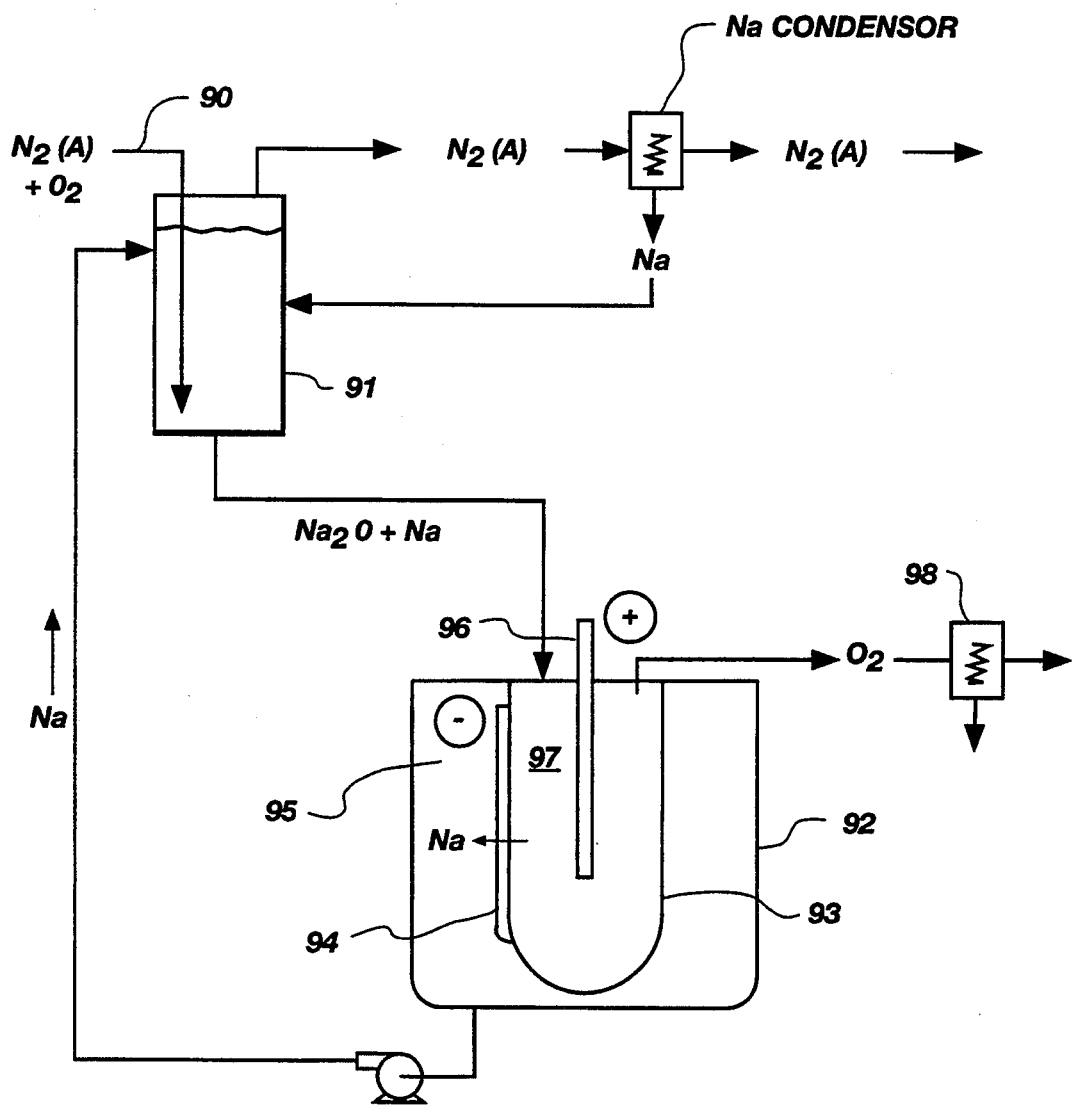
FIG. 9 illustrates a continuous process for oxygen removal and/or generation by continually reaching oxygen with molten sodium and continuously recovering sodium and oxygen in an electrochemical cell.

An oxygen removal system utilizing sodium beta alumina is illustrated in FIG. 9. The process is continuous with the gas stream to be treated passed through reactive metal in a liquid state wherein oxygen contained within the gas stream reacts with said metal to form a metal oxide. The metal oxide generally remains suspended in the molten metal as minute particles.

Alkali metals such as sodium, lithium and the like are particularly effective reactive metals as are copper, silver. These metals react rapidly with oxygen, have relatively low melting temperatures and can be formed into an ion transporting ceramic such as sodium beta alumina, Nasicon, Lithicon, silver iodide and the like.

In FIG. 9 the gas stream 90, which may be air, oxygen containing nitrogen or argon, is fed into an oxygen removal device 91 which may be a scrubber in which the gas stream is directed counter currently through a descending stream (shower) of reactive metal to form metal oxide particles in said reactive metal whereby substantially all the oxygen in the gas stream is removed.

A portion of the molten reactive metal containing oxide particles is removed from the scrubber and directed to an oxygen generation/reactive metal recovery device 92. An ion conducting membrane 93 which conducts ions of the reactive metal, e.g., the membrane may be sodium beta-alumina (sodium aluminate) having a cathode 94 in intimate contact with the pure metal in the cathode chamber 95. An anode 96 is placed in the anode chamber in intimate contact with the molten metal/metal oxide mixture.

A direct current is passed through the ion conducting membrane to drive metal ions into the cathode chamber from the anode chamber 97 and to release pure oxygen at the anode. The oxygen may contain minute particles of molten metal which may be readily removed by a condenser 98 so that pure oxygen uncontaminated by any other matter is recovered for disposal or for use in any process or operation requiring pure oxygen.

Molten metal from the cathode chamber 95 is returned to the scrubber.

The reactive metal recovery device (electrochemical cell) 92 is operated at a temperature above the melting point of the reactive metal. For metals such as sodium, lithium and the like, operation of the cell at temperatures in the range of 300°–350° C. is preferred to take advantage of the high conductivity of the ion conducting membrane at such temperatures. Very little heat, if any, needs to be added to the metal recovery cell inasmuch as the oxidation reaction in the scrubber is highly exothermic and tends to provide all the heat necessary in the system once operating temperatures are initially achieved.

The technique of capturing oxygen from a gas stream with a reactive metal, especially in liquid form, and then refining the metal oxide by passing metal ion through an ion conductive membrane is particularly useful. Metals, especially sodium, lithium, copper, silver, lead and similar metals, are very reactive with oxygen, so that even very minute amounts of oxygen in an inert gas stream are removed from the gas stream. The contact time of the metal in the gas stream may be very short, so that a small amount of recycled metal through a relatively small scrubber may effectively remove substantially all trace amounts of oxygen from an inert gas stream flowing at a high volumetric rate. This is possible because ion conductive membranes such as sodium ions to recover large volumes of sodium from sodium oxide dissolved in molten sodium.

Sodium beta-alumina, for example, has a conductivity of $1 \times 10^{-1}$ at 350° C. Furthermore, because the b.p. of sodium is about 880° C., the sodium recovery cells may be readily operated at temperatures of from about 300° C. to about 400° C. or even higher without experiencing especially high vapor pressures of sodium. Any sodium vapor which is carried with the oxygen stream emanating from the electrochemical cell may be raised through a small condenser operated just slightly above the melting point of sodium. Condensed sodium liquid can be returned to the oxygen removal scrubber. Also, the oxygen stream can be passed through microporous filters to remove any $Na_2O$ formed in the oxygen gas stream by reaction of oxygen and vaporous sodium or $Na_2O$ entrained in the gas stream.

Oxygen removal units for purifying inert gas may be constructed as small portable units which may be utilized at a point of use. Thus, inert gas may be purified at a facility using inert gas although large units could be readily installed downstream of an inert gas production unit, e.g., a cryogenic or pressure swing absorption unit.

Similar results can be achieved by substituting a traditional electrolytic cell for the sodium removal cell. A cell containing an anode and a cathode immersed in a bath of sodium and sodium oxide will yield oxygen at the anode and sodium at the cathode to thereby increase the sodium content of the liquid electrolyte so that the Na/Na$_2$O material being returned to the oxygen scrubber is much higher in sodium content than the material being discharged from the scrubber into the electrolytic cell.

Both the ion membrane cell and the traditional electrolytic cell have advantages. The traditional cell doesn't require a special membrane and isn't limited by the conductivity of the membrane. However, pure sodium is not returned to the oxygen scrubber. An ion membrane cell returns pure sodium (reactive metal) to the scrubber.

The oxygen removal system utilizing an ion membrane cell, or a traditional electrolytic cell, is a closed loop system. The inlet is an oxygen containing gas stream; outlets are an oxygen-depleted gas stream and a pure oxygen stream.

Similar processes may be utilized to remove nitrogen. FIG. 7 is a schematic illustration of an electrolysis cell for electrolyzing lithium nitride to lithium and nitrogen. Lithium nitride can be formed by reacting lithium with a nitrogen containing gas stream in a scrubber (see FIG. 9). An argon gas contaminated with nitrogen can be purified by use of a process similar to FIG. 9 wherein lithium is used as a molten metal and an electrolysis cell of the type illustrated in FIG. 7 substituted for the solid electrolyte cell illustrated in FIG. 9.

Figure 8:
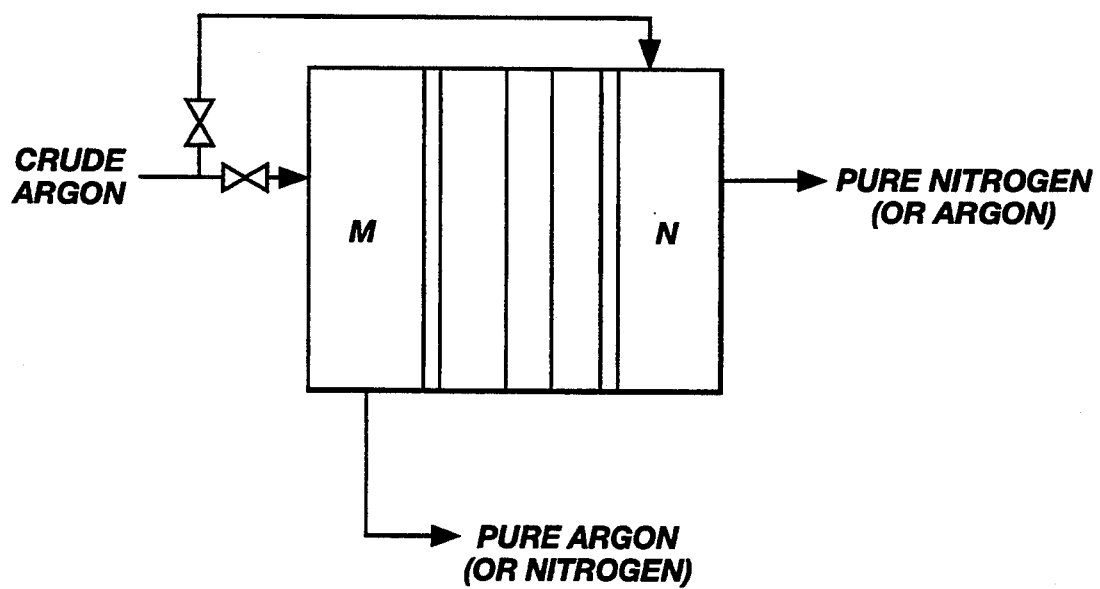
FIG. 8 illustrates the use of a single electrochemical cell for purification of argon by alternating flow of argon and applied potential in separate compartments.

FIG. 8 is a schematic representation of an electrochemical cell having two chambers (M and N) separated by a metal ion conducting electrolyte, e.g., sodium beta alumina, Nasicon, Lisicon, or the like, wherein argon containing nitrogen is first fed to chamber M wherein the nitrogen reacts with lithium, for example, to release pure argon. Chamber N would be in a regeneration stage, converting Li$_3$N to lithium, wherein the lithium is pumped through the solid electrolyte into chamber M to be available to react with nitrogen in the in-coming argon stream. As the lithium in chamber M becomes exhausted, the argon stream would be diverted to chamber N and the process repeated wherein lithium would be pumped from chamber M to chamber N, pure argon would exit chamber N and nitrogen would exit chamber M.

What is claimed is:

1. A method of removing O$_2$ and N$_2$ from crude argon comprising:
   contacting said crude argon with a solid oxygen-ion conducting electrolyte under oxygen-ion conducting conditions to remove O$_2$ from said crude argon;
   contacting said oxygen-depleted crude argon with lithium metal under lithium nitride forming conditions to remove nitrogen and to form lithium nitride;
   recovering said purified argon; and electrolytically converting said lithium nitride to reform said lithium metal.

2. The method of claim 1, wherein said electrolytically converting of said lithium nitride to lithium metal is done in situ.

3. The method of claim 2, wherein said electrolytically converting of said lithium nitride to generate lithium metal is done concurrently with the formation of lithium nitride.

4. The method of claim 1, wherein lithium metal is kept molten between 180° C. to 400° C.

5. The method of claim 1, wherein lithium metal exists in the electrochemical cell.

6. The method of claim 1, wherein lithium metal exists in the form of lithium alloys or compounds thereof selected from the group consisting of LiAl and LiSi, and lithium metal supported on high surface area Al$_2$O$_3$, MgO and carbon materials.

7. The method of claim 1, wherein an electronic measurement and control system is implemented to determine the purity of output inert gas and to automatically change to an alternate lithium purifier when the output inert gas shows signs of impurity increase above specified limit.

8. The method of removing O$_2$ and N$_2$ from a crude inert gas comprising contacting said crude inert gas directly with a reactive metal under metal oxide as well as metal nitride forming conditions to remove oxygen, nitrogen and trace H$_2$O, recovering said purified inert gas and electrolytically converting said metal oxide and metal nitride to reform same into said reactive metal.

9. The method of claim 8, wherein the said metal is lithium and electrolytic converting of said Li$_3$N and Li$_2$O mixture to lithium metal is done in situ.

10. The method of claim 8, wherein the temperature during removal is in the range of 25° C. to 500° C. while the temperature during regeneration of metal is in the range of 180° C. to 500° C.

11. The method of claim 8, wherein the inert gas can be impure Ar, He, Xe, and Ne and mixtures thereof.

12. The method of claim 8, wherein said reactive metal is sodium and said sodium oxide and sodium nitride are reformed into sodium by use of an electrochemical cell containing a sodium ion conducting electrolyte.

13. The method of claim 8, wherein said inert gas is argon.

14. The method of claim 8, wherein said reactive metal is lithium and said lithium oxide and lithium nitride are reformed into lithium by use of an electrochemical cell containing a lithium ion conductor.

15. A method of separating oxygen from a non-reactive gas comprising contacting said gas with a molten, oxygen-forming metal to form a metal oxide and recovering said metal by use of an electrochemical cell containing a solid-state, metal ion conducting electrolyte.

16. The method of claim 15, wherein said metal is sodium.

17. The method of claim 16, wherein said electrolyte is sodium beta-alumina.

18. A method of removing O$_2$ and N$_2$ from a crude inert gas selected from the group consisting of argon, helium, zenon, neon comprising:
   contacting said crude inert gas with a solid oxygen-ion conducting electrolyte under oxygen-ion conducting conditions to remove O$_2$ from said crude inert gas;
   contacting said oxygen-depleted crude argon with a nitrogen-reactive metal under metal nitride forming conditions to remove nitrogen and to form a metal nitride;
   recovering said purified argon; and
   electrolytically converting said metal nitride to reform said lithium metal.

19. The method of claim 18, wherein said reactive metal is selected from the group consisting of sodium and sodium alloys, copper and copper alloys and other single valent metal and their alloys.

* * * * *

UNITED STATES PATENT AND TRADEMARK OFFICE
CERTIFICATE OF CORRECTION

PATENT NO. : 5,399,246

DATED : March 21, 1995

INVENTOR(S) : Ashok V. Joshi

It is certified that error appears in the above-indentified patent and that said Letters Patent is hereby corrected as shown below:

In Column 3, line 27, change "electrodes" to --electrolysis--.

Signed and Sealed this

Tenth Day of October, 1995

Attest:

BRUCE LEHMAN

*Attesting Officer*   *Commissioner of Patents and Trademarks*